United States Patent
Howard

(10) Patent No.: US 10,532,686 B2
(45) Date of Patent: Jan. 14, 2020

(54) REFUSE BAG SUPPORT APPARATUS FOR USE WITH A VEHICLE

(71) Applicant: Robert Lee Howard, Cypress, TX (US)

(72) Inventor: Robert Lee Howard, Cypress, TX (US)

( * ) Notice: Subject to any disclaimer, the term of this patent is extended or adjusted under 35 U.S.C. 154(b) by 0 days.

(21) Appl. No.: 15/152,730

(22) Filed: May 12, 2016

(65) Prior Publication Data

US 2016/0332551 A1   Nov. 17, 2016

Related U.S. Application Data

(60) Provisional application No. 62/161,083, filed on May 13, 2015.

(51) Int. Cl.
   *B60N 3/08* (2006.01)

(52) U.S. Cl.
   CPC .................... *B60N 3/08* (2013.01)

(58) Field of Classification Search
   CPC ...... B60N 3/08; B60N 2/5841; B60N 2/6045; B60N 3/106
   See application file for complete search history.

(56) References Cited

U.S. PATENT DOCUMENTS

| | | | | |
|---|---|---|---|---|
| 2,830,748 A * | 4/1958 | Faltin | ................ | B60N 3/08 224/547 |
| 2,933,225 A * | 4/1960 | Fry | ................ | B60N 3/08 224/483 |
| 4,697,780 A * | 10/1987 | Wenkman | ................ | B60N 3/103 248/311.2 |
| 4,887,323 A * | 12/1989 | DiVito | ................ | A47K 3/003 4/511 |
| 5,020,751 A * | 6/1991 | Larkin | ................ | B65B 67/12 248/99 |
| 5,659,904 A * | 8/1997 | Doczy | ................ | C23C 18/44 248/228.3 |
| 5,996,957 A * | 12/1999 | Kurtz | ................ | A47G 23/0225 248/231.21 |
| 6,283,042 B1 * | 9/2001 | Wargo | ................ | A47D 1/008 108/26 |
| 7,793,904 B2 * | 9/2010 | Scarton | ................ | A47G 23/0225 224/414 |
| 7,823,230 B2 * | 11/2010 | Meyers | ................ | A47K 3/003 4/577.1 |
| 8,636,319 B1 * | 1/2014 | Parker, Jr. | ................ | A47C 7/62 248/311.2 |
| 8,870,044 B1 * | 10/2014 | Freese | ................ | F16B 2/12 224/407 |
| 2015/0203015 A1 * | 7/2015 | Evans | ................ | B60N 3/08 296/37.12 |

* cited by examiner

*Primary Examiner* — Derek J Battisti

(74) *Attorney, Agent, or Firm* — Matthew M. Googe; Robinson IP Law, PLLC

(57) ABSTRACT

A refuse bag support apparatus for use with a vehicle is provided. The support apparatus includes a base member having a frame and a first pad slidably mounted to a second pad, the first pad and the second pad oriented substantially parallel to each other and able to adjust to create space sufficiently large to permit a tire of the vehicle to be disposed between the first pad and the second pad to support the base member, and a collar mechanically coupled to the frame of the base member. The collar supports a refuse bag.

1 Claim, 2 Drawing Sheets

REFUSE BAG SUPPORT APPARATUS FOR USE WITH A VEHICLE

CROSS-REFERENCE TO RELATED APPLICATION

This application claims priority to U.S. Patent Application Ser. No. 62/161,083 to Robert Lee Howard for a Refuse Bag Support Apparatus for Use With a Vehicle, which was filed on May 13, 2015, the contents of which are incorporated herein by reference in its entirety.

FIELD

The embodiments herein relate generally to refuse trash bags and/or receptacles.

BACKGROUND

At outdoor events, trash receptacles are staged at common areas. People sometimes choose to have a refuse bag closer to their immediate area. Carrying personal refuse cans is inconvenient and people may simply tie or attach loose refuse bags to a nearby fixture. Alternatively, people may also utilize unsecured bags, which require additional user burdens to place trash into the bag. These situations are problematic because unsecured bags may be blown away by wind, which can deposit trash on the ground.

As such, there is a need in the industry for a refuse bag support apparatus that addresses the limitations of the prior art, which can be secured to readily available stationary objects such as vehicles.

SUMMARY

A refuse bag support apparatus for use with a vehicle is provided. The support apparatus comprises a base member comprising a frame and a first pad slidably mounted to a second pad, the first pad and the second pad oriented substantially parallel to each other and configured to adjust to create space sufficiently large to permit a tire of the vehicle to be disposed between the first pad and the second pad to support the base member, and a collar mechanically coupled to the frame of the base member, wherein the collar is configured to support a refuse bag.

In a first aspect, a refuse bag support apparatus includes a base member including a frame and a front pad slidably mounted to a rear pad, the front pad and the rear pad oriented substantially parallel to each other and configured to ad-just to create space sufficiently large to permit a tire of the vehicle to be disposed between the front pad and the rear pad to support the base member and a collar mechanically coupled to the frame of the base member, wherein the collar is configured to support a refuse bag.

In one embodiment, the refuse bag support apparatus includes a compression slide between the front pad and the rear pad for urging a face of the front pad towards a face of the rear pad.

In another embodiment, the frame includes a pair of parallel slide guides attached at a first end to the rear pad and extending through the front pad for guiding movement of the front pad relative to the rear pad. In yet another embodiment, the refuse bag support apparatus includes a mounting base face attached to a second end of the pair of parallel slide guides.

In a second aspect, a refuse bag support apparatus includes a base member having a front pad having an inner face, a rear pad having an inner face that is opposing to the inner face of the front pad, a frame comprising a pair of parallel slide guides attached at a first end to the rear pad, the slide guides extending through the front pad and attaching to a mounting base face attached to a second end of the slide guides, and a compression slide located between the front pad and the rear pad for urging the front pad towards the rear pad; and a collar mechanically coupled to the frame of the base member, wherein the collar is configured to support a refuse bag.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

Figure 1:
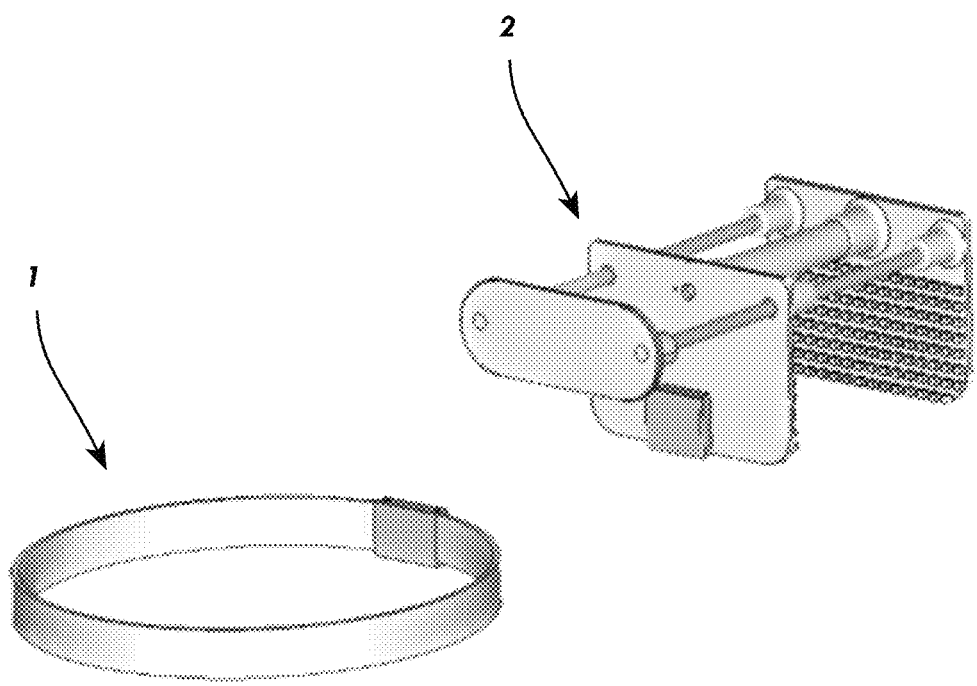
FIGS. 1 and 2 show a refuse bag support apparatus according to one embodiment the present disclosure.
Figure 2:
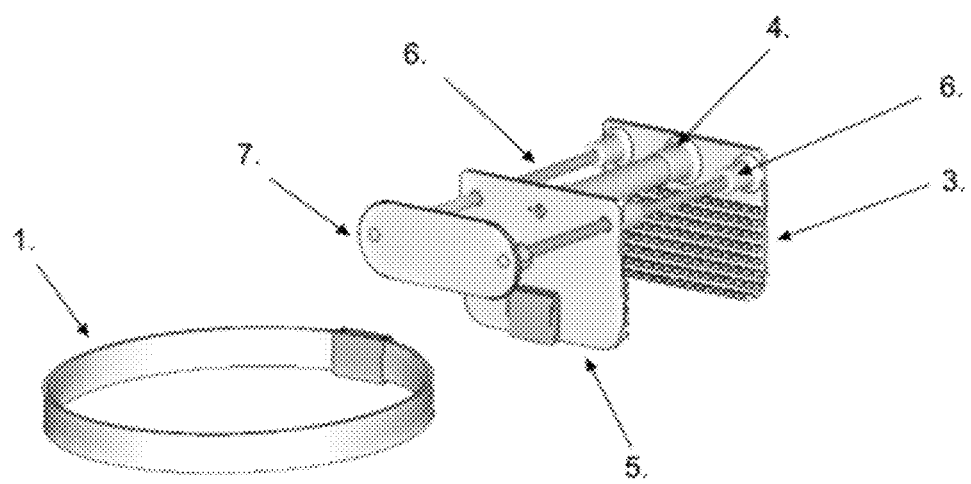

As depicted in FIGS. 1 and 2, the refuse bag support apparatus comprises trash bag collar (1) and mounting base (2), which are made from molded or jetted ABS plastic. Trash bag collar (1) and mounting base (2) may be secured together by male/female fastening components or any alternative type of fasteners. The mounting base (2) comprises rear pad (3), compression slides (4), front pad (5), slide guides (6) and mounting base face (7). Compression slide (4) permits the front pad (5) and rear pad (3) to slidably adjust relative to each other such that the front pad (5) and rear pad (3) are urged towards one another. Compression slide (4) may be any type of spring mechanisms known in the field. The compression slide (4) includes a spring or other device and is configured to urge an inside face of the front pad (5) towards an inside face of the rear pad (3). Slide guides (6) connect mounting base face (7) to front pad (5), and facilitate sliding of the front pad (5) with respect to the rear pad (3) without allowing binding or other interference. Trash bag collar (1) is secured to mounting base face (7).

In operation, mounting base (2) is positioned near a stationary object such as the top of the vehicle's tire. When mounting on a vehicle tire it may be necessary to place the device over the tire at the widest point between the vehicle's tire and fender. Front pad (5) is slidably adjusted relative to rear pad (3) along the slide guides (6) to generate sufficient space between the front and rear pads for the vehicle's tire to be positioned therein. After positioning the vehicle's tire between the front pad (5) and rear pad (3), the front pad (5) and rear pad (3) are urged towards one another by the compression slide (4) to substantially secure the vehicle's tire between the front pad (5) and rear pad (3). In this position, mounting base (2) is supported on top of the tire with the tire positioned between the front and rear pads. A trash bag (not shown) is placed through trash bag collar (1)

from the bottom and pulled over the collar. In this configuration, the trash bag is conveniently supported proximate the vehicle.

It shall be appreciated that the components of the refuse bag support apparatus described in several embodiments herein may comprise any alternative known materials in the field and be of any color, size and/or dimensions. It shall be appreciated that the components of the refuse bag support apparatus described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A refuse bag support apparatus for clamping onto opposing sides of an object, the support apparatus comprising:
   a rear pad having a planar face thereon;
   a pair of slide guides having first ends and second ends located distal from the first ends, the first ends of the pair of slide guides mounted to an upper end of the planar face of the rear pad;
   a mounting base face mounted to the second ends of the pair of slide guides;
   a front pad having a planar face thereon and oriented to face the planar face of the rear pad, the front pad slidably mounted on the pair of slide guides between the rear pad and the mounting base face;
   a compression spring mounted at a first end to the front pad and at a second end to the rear pad, the compression spring configured to resiliently bias the front pad towards the rear pad such that the object is compressed therebetween; and
   a trash bag collar mounted on one of the mounting base face and front pad, the trash bag collar configured to support a trash bag thereon.

* * * * *